US007533977B2

(12) United States Patent
Park

(10) Patent No.: US 7,533,977 B2
(45) Date of Patent: May 19, 2009

(54) SOLID INK LOADING APPARATUS

(75) Inventor: Jeong-yeon Park, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 11/411,776

(22) Filed: Apr. 27, 2006

(65) Prior Publication Data

US 2006/0244798 A1 Nov. 2, 2006

(30) Foreign Application Priority Data

Apr. 28, 2005 (KR) ...................... 10-2005-0035436

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95
See application file for complete search history.

(56) References Cited

U.S. PATENT DOCUMENTS 5,565,900 A * 10/1996 Cowger et al. ................ 347/42
5,784,089 A * 7/1998 Crawford ..................... 347/88
5,861,903 A 1/1999 Crawford et al.
5,975,690 A * 11/1999 Grellmann et al. ............ 347/88
6,003,971 A * 12/1999 Hanks et al. .................. 347/43
6,094,207 A * 7/2000 Wen et al. ................ 346/140.1

FOREIGN PATENT DOCUMENTS

JP 2-115443 9/1990
JP 7-68811 3/1995
JP 2001-113270 4/2001

* cited by examiner

*Primary Examiner*—Stephen D Meier
*Assistant Examiner*—Leonard S Liang
(74) *Attorney, Agent, or Firm*—Stein McEwen, LLP

(57) ABSTRACT

A solid ink loading apparatus, including an ink stick feed bin having a plurality of feed channels that receive a plurality of ink sticks by colors, an ink stick feed bin cover to open and close the ink stick feed bin, a yoke interlockingly operating with the ink stick feed bin cover, melt plates installed at one end of the feed channels to melt the ink sticks, and elastic push units elastically connected to the yoke to push the ink sticks in the feed channels towards the melt plates, wherein the plurality of feed channels are arranged in a staggered formation with respect to at least one other feed channel in the longitudinal direction.

20 Claims, 5 Drawing Sheets

SOLID INK LOADING APPARATUS

CROSS-REFERENCE TO RELATED APPLICATION

This application claims the benefit of Korean Application No. 2005-35436, filed Apr. 28, 2005, in the Korean Intellectual Property Office, the disclosure of which is incorporated herein by reference.

BACKGROUND OF THE INVENTION

1. Field of the Invention

Aspects of the present invention relates in general to a solid ink loading apparatus and, more specifically, to a solid ink loading apparatus which disperses and/or breaks up an elastic force pressing a solid ink.

2. Description of the Related Art

A solid ink printing technique has been commercially successful in printers. The technique makes use of a special ink jet printer head provided with thousands of nozzles, each ink jet printer head being about 21 cm (i.e., the width of an A4 size sheet of paper) in length. The ink is normally solid at room temperature and melts in the printer head when the printer head operates at or above 140° C. Compared with liquid ink, a color ink stick which is in a solid state is more durable, prints faster, and exhibits clear colors on all types of papers including expensive bond papers for business use and recycled papers.

Unlike traditional printers, which stop working when printing materials run out, in solid ink printing techniques a user is allowed to add solid color sticks even in the middle of a printing process. In addition, since a separate ink cartridge is not required, the printers may be mass produced without difficulties. Solid crayon matters used as an ink material are low in price. Thus, compared with other laser printers, a solid ink jet printer may be purchased at a 12-20% lower price, and maintenance costs may be lower than half of that of the laser printer.

FIG. 1 illustrates the structure of a solid ink stick feed system used in a solid ink jet printer of a related art. Particularly, FIG. 1 shows the structure disclosed in U.S. Pat. No. 5,861,903. FIG. 2 is a partial top perspective view of an ink stick loading bin assembly of FIG. 1. As shown in FIGS. 1 and 2, the ink stick feed system is largely composed of an ink stick loading bin assembly 16, a yoke 17, a top cover 20, and an ink stick feed bin cover 30. The ink stick loading bin assembly 16 comprises feed chutes 25*a*-25*d* in which ink sticks 12 are stored by colors and from which the ink sticks 12 are fed towards melt plates 29*a*-29*d*, and at least one key plate 18 to cover the feed chutes 25*a*-25*d*. Openings or receptacles 24*a*-24*d* are formed in the key plate 18 so that the ink sticks 12 may be inserted therein. The top cover 20 is installed to cover the top of the key plate 18. A feed cover 30 is rotatably installed near the printer sidewalls 21 by pivot arms 22. The yoke 17 is slidably positioned along the upper side of the key plate 18 to assist in the movement of each ink stick 12. Here, the ink stick 12 moves forward on the feed chutes 25*a*-25*d* towards the melt plates 29*a*-29*d*.

Ink sticks 12 are inserted into the receptacles or openings 24*a*-24*d* in the key plate 18 and are fed down the corresponding ink stick feed chutes 25*a*-25*d* to the melt plates 29*a*-29*d*, which melt the ink and feed the melted ink into the individual ink color reservoirs within the print head (not shown).

FIG. 3 is a perspective view of push blocks that push the ink stick 12 of FIGS. 1 and 2. As shown in FIG. 3, four push blocks 50*a*-50*d* are connected to the yoke 17 through springs 54. The side ends of the yoke 17 are held by the key plate 18 in a track 19 to provide a linear slide along the opposing sides of the key plate 18. At first, ink sticks 12 are put in the feed chutes 25*a*-25*d* and the top cover 20 is closed. Then, the ink stick feed cover 30 is interlocked, and the yoke 17 is transferred to where the melt plates 29*a*-29*d* are located. The push blocks 50*a*-50*d* push the ink sticks 12 towards the melt plates 29*a*-29*d* using the elastic force of the springs 54. Thus, contact between the ink sticks 12 and the melt plates 29*a*-29*d* is improved.

However, the push blocks 50*a*-50*d* each come into contact with the ink sticks 12 reserved on the feed chutes 25*a*-25*d*, respectively. Thus, the resisting force from the springs 54 of the push blocks 50*a*-50*d* is applied quadruply (i.e., four times), making it very difficult for a user to shut the top cover 20. Moreover, since the feed chutes 25*a*-25*d* have a similar length, the user may be required to replenish a color ink stick 12 where printing operations have a high consumption rate.

SUMMARY OF THE INVENTION

It is, therefore, an aspect of the present invention to provide a solid ink loading apparatus with an improved ink stick loading mechanism to help a user more easily close a top cover. It is another aspect of the present invention to provide a solid ink loading apparatus with an improved ink stick feed efficiency.

To achieve the above and/or other aspects and advantages, there is provided a solid ink loading apparatus, comprising: an ink stick feed bin having a plurality of feed channels that receive a plurality of ink sticks by colors; an ink stick feed bin cover to open and close the ink stick feed bin; a yoke interlockingly operating with the ink stick feed bin cover; melt plates installed at one end of the feed channels to melt the ink sticks; and elastic push units elastically connected to the yoke to push the ink sticks in the feed channels towards the melt plates, wherein the plurality of feed channels are arranged in a staggered formation with respect to at least one other feed channel in the longitudinal direction.

The feed channels are arranged in such a manner that ends of the feed channels on the opposite side of the push direction of the ink sticks have the different position from each other. According to embodiments of the invention, the feed channels may have different lengths, or they may be the same length, but arranged in a stepped structure. In both cases, the feed channels receive the ink sticks by colors.

Where the feed channels have different lengths, an ink stick with a highest consumption rate may be put in a longer feed channel. The elastic push units generate the same magnitude of elastic force.

The feed channels are separable by colors. The feed channels receive ink sticks of yellow, magenta, cyan and black, respectively.

Therefore, by longitudinally arranging the feed channels which reserve and feed ink sticks in a stepped structure, the resisting force impressed on the cover may be reduced. In result, a user may more easily close the cover.

In addition, by differentiating the length of the feed channels and by putting an ink stick of a highest consumption rate in the longest feed channel, the feed efficiency of ink sticks may be improved.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
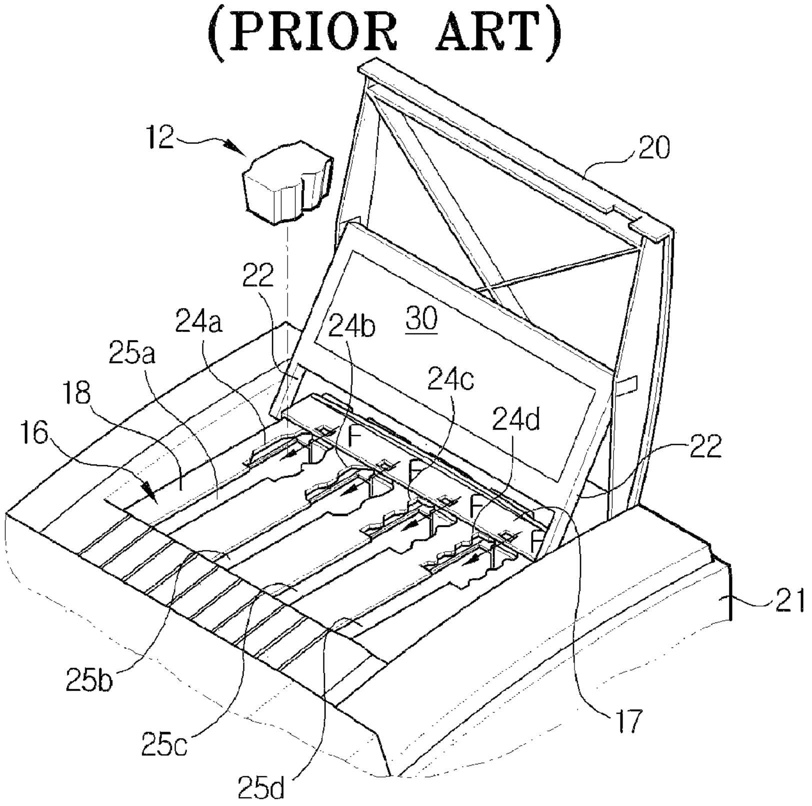
FIG. 1 (PRIOR ART)
FIG. 1 is a perspective view of a solid ink stick feed system used in a related art solid ink jet printer, which is disclosed in U.S. Pat. No. 5,861,903.
Figure 2:
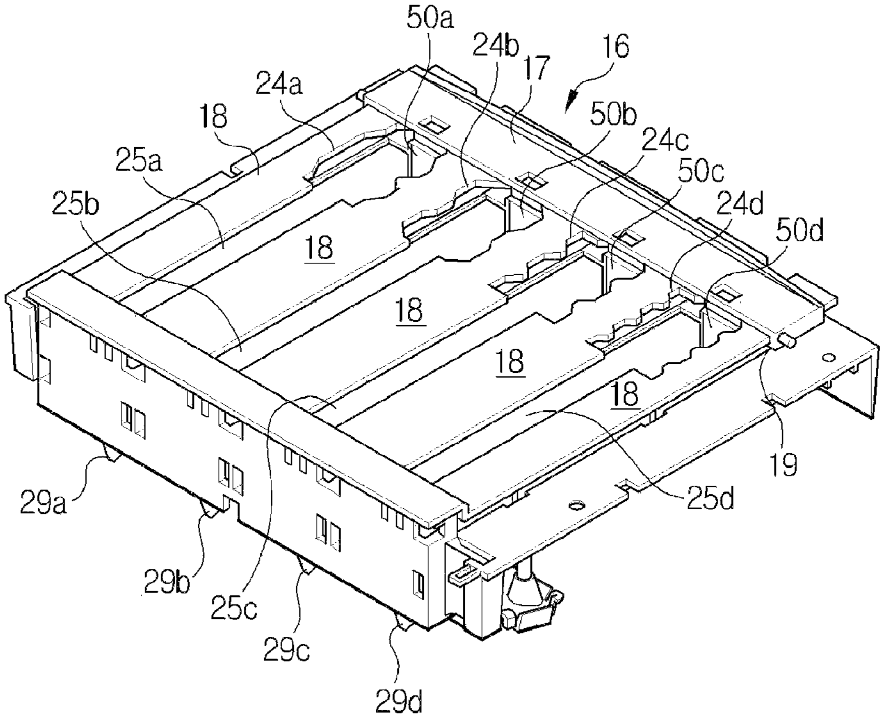
FIG. 2 (PRIOR ART)
FIG. 2 is a partial top perspective view of an ink stick loading bin assembly of FIG. 1.
Figure 3:
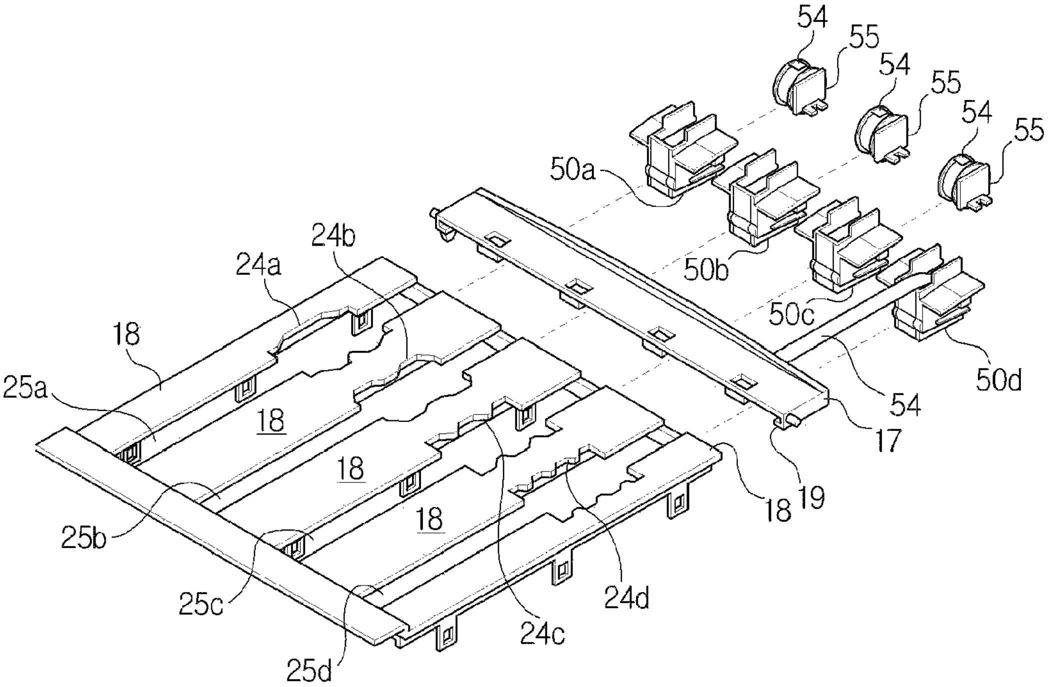
FIG. 3 (PRIOR ART)
FIG. 3 is a perspective view of push blocks that push ink sticks of FIGS. 1 and 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
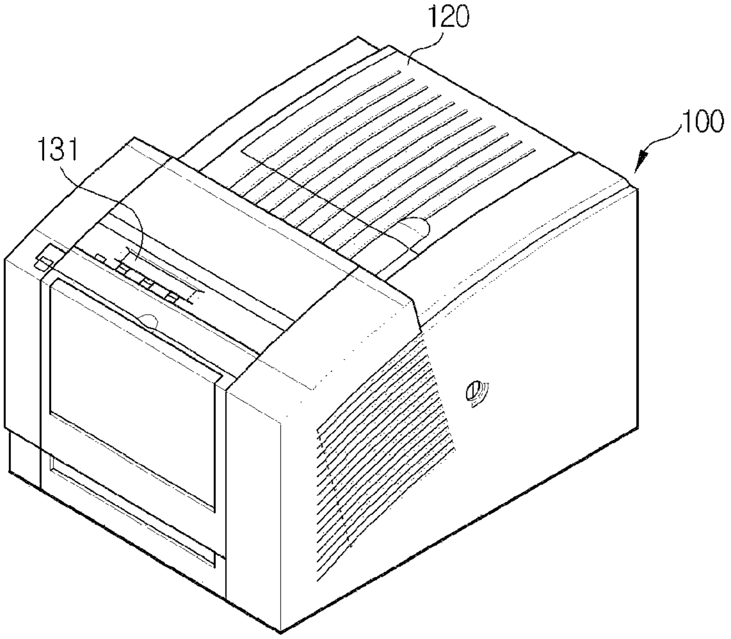
FIG. 4 is a perspective view of a solid ink jet printer according to one embodiment of the present invention.
Figure 5:
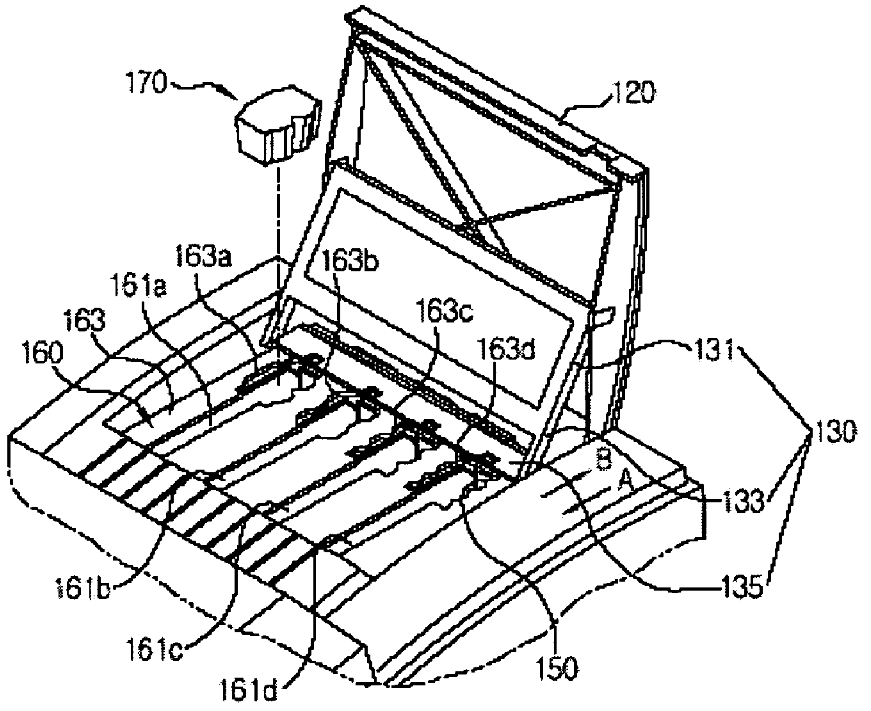
FIG. 5 is an enlarged partial top perspective view of a solid ink loading assembly with a top cover opened of the solid ink jet printer of FIG. 4.

FIG. 4 is a perspective view of a solid ink jet printer. As shown in FIG. 4, the printer 100 is covered by a top cover 120. A front-side display screen displays a message related to the status of the printer, such as, information on a residual amount of ink. FIG. 5 is an enlarged partial top perspective view of a solid ink loading assembly of the printer 100 with the top cover of FIG. 4 opened. Referring to FIG. 5, the solid ink loading apparatus includes an ink stick feed bin 160, a top cover 120, an interlocking unit 130, and an elastic push unit 150.

The ink stick feed bin 160 forms channels to receive ink sticks 170 and from which the ink sticks 170 are fed to melt plates (to be described later). In detail, the ink stick feed bin 160 includes a plurality of feed channels 161*a*-161*d* to receive the ink sticks 170, and a key plate 163 which covers the top of the feed channels 161*a*-161*d*. the key plate 163 is provided with openings 163*a*-163*d* into which the ink sticks 170 are inserted. The feed channels 161*a*-161*d* are designed to receive the ink sticks 170 (171*a*-171*d*) in accordance with the colors of each ink stick 1701*a*-171*d*, i.e., black, yellow, cyan and magenta. The feed channels 161*a*-161*d* may be built as one body, or separately.

The interlocking unit 130 includes a feed cover 131 that is connected to the top cover 120, and a yoke 135 that is hinged on support arms 133 of the feed cover 131. When the top cover 120 is opened, the feed cover 131 is lifted together with the top cover, and the yoke 135, which is connected to the support arms 133 of the feed cover 131, moves backward along the direction of the arrow B. The yoke 135, thereby opens the openings 163*a*-163*d* of the key plate 163. With the openings 163*a*-163*d* opened, the ink sticks 170 may be inserted through the openings 163*a*-163*d*. On the other hand, when the top cover 120 is closed, the reverse of the above-described procedure is carried out. That is, the yoke 135 moves forward along the direction of the arrow A, and the elastic push unit 150, connected to the yoke 135, pushes the rear side of the ink sticks 170, having been placed in the feed channels 161*a*-161*d*, along the feed channels 161*a*-161*d* in the longitudinal directions thereof. Thus, the ink sticks 170 and the melt plates 181*a*-181*d* are biased to remain in contact with each other as long as the top cover 120 remains closed. When the ink sticks 170 melt through the contact with the melt plates 181*a*-181*d*, the liquid ink is fed to a reservoir of a print head (not shown).

Figure 6:
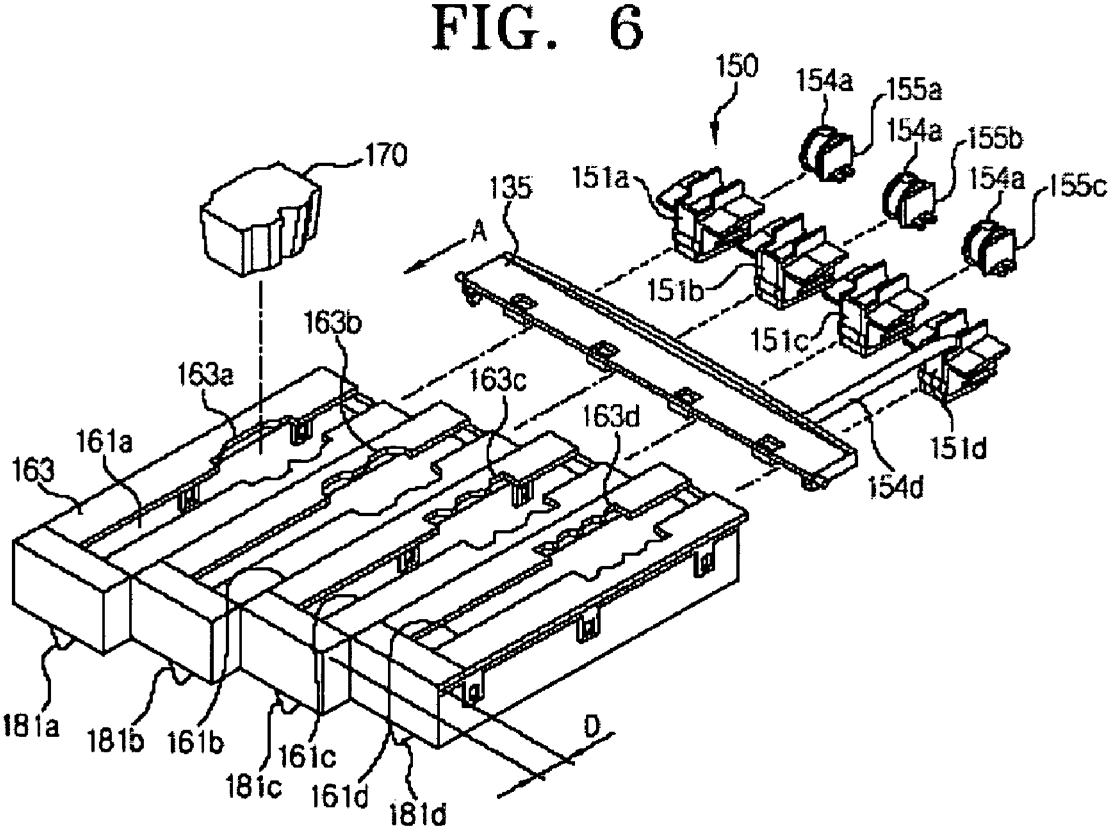
FIG. 6 is an exploded perspective view of feed channels of the solid ink loading assembly of FIG. 5.

FIG. 6 is an exploded perspective view of the feed channels according to the present invention. As can be seen in FIG. 6, a plurality of feed channels 161*a*-161*d* are longitudinally arranged in a staggered structure to have the appearance of each feed channel 161*a*-161*d* being a step ahead or behind the adjacent feed channel 161*a*-161*d*. As above, according to this embodiment, the ink sticks 170 in the feed channels 161*a*-161*d* are biased towards the melt plates 181*a*-181*d* by the elastic push unit 150. The elastic push unit 150 is installed below the yoke 135, and comprises a plurality of push blocks 151*a*-151*d* to operate in a one-to-one correspondence with the feed channels 161*a*-161*d*, hubs 155*a*-155*d* provided to the push blocks 151*a*-151*d*, and plate springs 154*a*-154*d*, which wind around the hubs 155*a*-155*d* and which have one end connected to the yoke 135. Therefore, when the yoke 135 moves forward along the direction of the arrow A, the push blocks 151*a*-151*d* push the rear side of the ink sticks 170 by the elastic force from the plate springs 154*a*-154*d*, and bias the ink sticks 170 to contact the melt plates 181*a*-181*d*. The push blocks 151*a*-151*d* and the plate springs 154*a*-154*d* may be diverse in shape and structure.

Figure 7:
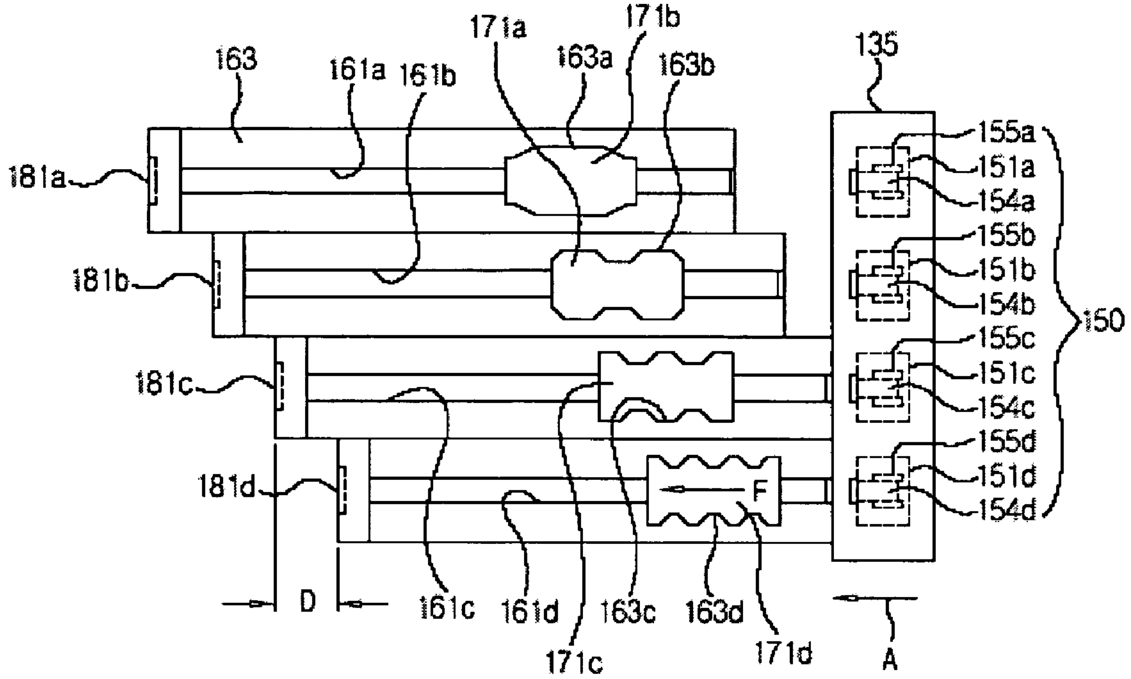
FIG. 7 is a diagram for explaining the reduction of resisting force with a top cover closed, in which feed channels have a stepped structure according to a first embodiment of the present invention.

FIG. 7 is a diagram to explain the reduction of a resisting force with the top cover closed, in which the feed channels have a staggered structure. As shown in FIG. 7, the feed channels 161*a*-161*d* have the same length, but they are arranged at step differences D in the longitudinal direction from the adjacent feed channels 161*a*-161*d*. Because of this stepped structure, the ink sticks 171*a*-171*d*, which are inserted into the feed channels 161*a*-161*d* through the openings 163*a*-163*d* of the key plate 163, also form the predetermined step difference D with each other. When the top cover 120 is closed in this state (see FIG. 5), the yoke 135 moves forward along the direction of the arrow A. At this time, only the ink stick 171*d* in the feed channel 161*d* comes in contact with the front side of the push block 151*d*. Therefore, the resisting force F, as opposed to the resisting force 4F of the related art, is applied to the yoke 135. In other words, when a user covers the top cover 120 for the first time, he or she will feel much less resisting force (the resisting force will be reduced by 3F) to the top cover 120. As the user continues to close the top cover 120, the resisting force F applied to the yoke steadily increases as the yoke engages the push blocks 151*c*-151*a*. Of course, it is understood that the stepped structure of the feed channels 161*a*-161*d*, as described in this embodiment, may be varied and that the feed channels 161*a*-161*d* may be arranged in different patterns.

Figure 8:
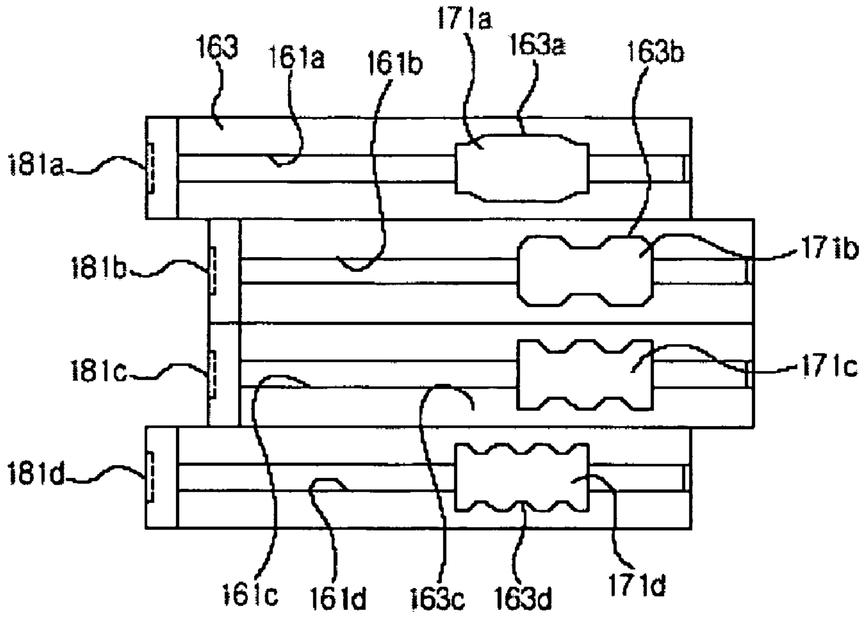
FIG. 8 illustrates an arrangement of feed channels according to a second embodiment of the present invention.

FIG. 8 illustrates a different arrangement of the feed channels according to a second embodiment of the present invention. As may be seen in FIG. 8, the feed channels 161*a*-161*d* again each have the same length, but the center two feed channels 161*b* and 161*c* are located in the same positions as each other while the outside feed channels 161*a* and 161*d* are each located at the staggered positions.

Figure 9:
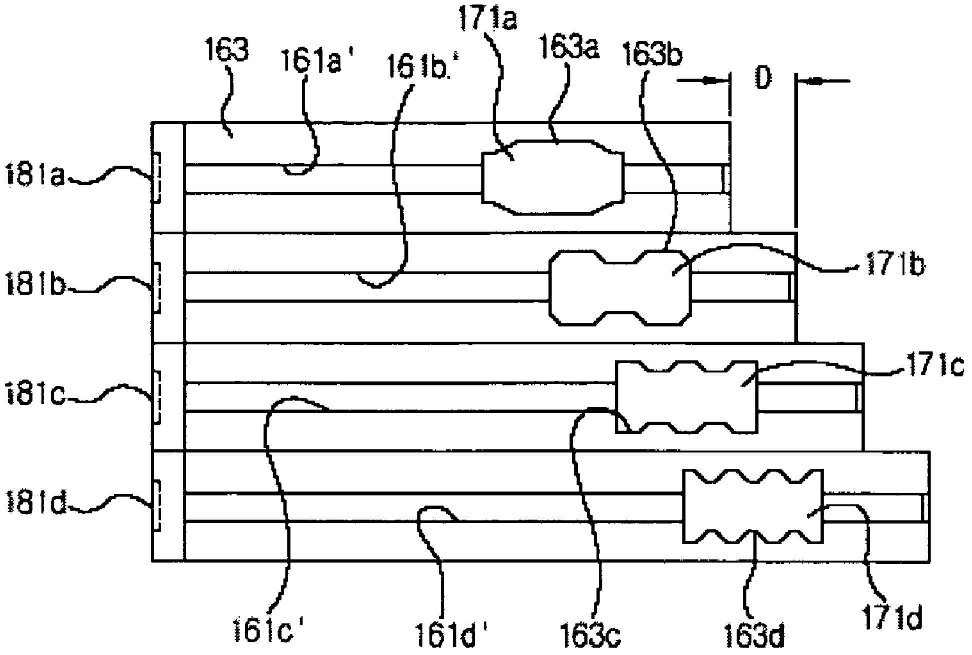
FIG. 9 illustrates an arrangement of feed channels according to a third embodiment of the present invention.

FIG. 9 illustrates a different arrangement of the feed channels according to a third embodiment of the present invention. In this embodiment, each feed channel 161*a*'-161*d*' has a different length. One end of each feed channel 161*a*'-161*d*' is attached to the corresponding melt plate 181*a*-181*d* of the feed channel 161*a*'-161*d*' in a straight line. As a result of this arrangement, the other ends of the feed channels 161*a*'-161*d*' (i.e., the ends on the opposite side of the melt plates 181*a*-181*d*) are staggered with respect to each other. By differentiating the length of the feed channels 161*a*'-161*d*', the feed efficiency of ink sticks 170 may be improved. For instance, an ink stick 171*d* having a high consumption rate is put in the longest feed channel 171*d*, so that the user is not required to replenish the ink of that ink stick 171*d* very often in comparison with the others. In general, black ink in the monochromatic mode is used the most and, therefore, has the highest consumption rate.

Figure 10:
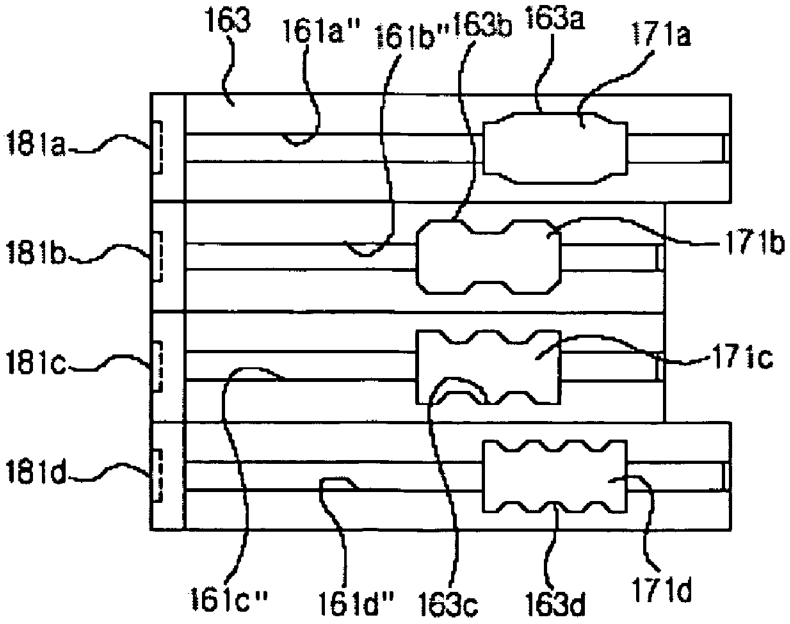
FIG. 10 illustrates an arrangement of feed channels according to a fourth embodiment of the present invention.

FIG. 10 illustrates a different arrangement of the feed channels according to a fourth embodiment of the present invention. As shown in FIG. 10, the outside feed channels 161*a*" and 161*d*", are longer than the center feed channels 161*b*" and 161*c*". Nevertheless, each feed channel 161*a*"-161*d*" is still connected to the corresponding melt plates 181*a*-181*d* in a straight line.

In the embodiments described so far, the feed cover 131 and the yoke 135 were interlocked with the top cover 120. However, it is also possible that only the feed cover 131 and yoke 135 may be utilized without the top cover 120. Moreover, the feed cover 131 may be simply linked to the top cover 120.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A solid ink loading apparatus, comprising:
- an ink stick feed bin having a plurality of feed channels that receive a plurality of ink sticks by colors;
- an ink stick feed bin cover to open and close the ink stick feed bin;
- a yoke interlockingly operating with the ink stick feed bin cover;
- melt plates installed at one end of the feed channels to melt the ink sticks; and
- elastic push units elastically connected to the yoke to push the ink sticks in the feed channels towards the melt plates, wherein the plurality of feed channels are arranged in a staggered formation with respect to at least one other feed channel in the longitudinal direction.

2. The apparatus according to claim 1, wherein the feed channels each have a similar length, and wherein both ends of each of the feed channels have different positions from the others.

3. The apparatus according to claim 1, wherein the feed channels are arranged shoulder to shoulder, and wherein central ones of the feed channels are positioned at a first position and the outside feed channels are each positioned at a second position, the second position being staggered from the first position.

4. The apparatus according to claim 1, wherein the feed channels each have different lengths, respectively, and wherein corresponding ends of the feed channels are attached to the corresponding melt plate in a straight line.

5. The apparatus according to claim 4, wherein the ink stick associated with a highest consumption rate is put in the feed channel having the longest length.

6. The apparatus according to claim 1, wherein the feed channels are arranged shoulder to shoulder, wherein central ones of the feed channels are positioned at a first position and the outside feed channels are each positioned at a second position, the second position being staggered from the first position, and wherein corresponding ends of the feed channels are attached to the corresponding melt plate in a straight line.

7. The apparatus according to claim 6, wherein the ink stick associated with a highest consumption rate is put in the feed channel having the longest length.

8. The apparatus according to claim 1, wherein the feed channels each supply a different colored ink.

9. The apparatus according to claim 1, further comprising:
- a top cover to cover the ink stick feed bin cover.

10. A solid ink loading apparatus, comprising:
- an ink stick feed bin having at least two feed channels to receive ink sticks;
- a top cover to open and close the ink stick feed bin;
- interlocking units interlockingly operating in accordance with the opening and closing of the top cover; and
- an elastic push unit elastically connected to the interlocking unit to elastically push the ink sticks in the feed channels, wherein the feed channels are arranged to have different predetermined positions with respect to at least one other feed channel in the longitudinal direction,
- wherein the feed channels are arranged shoulder to shoulder, and wherein central ones of the feed channels are positioned at a first position and the outside feed channels are each positioned at a second position, the second position being staggered from the first position.

11. A solid ink loading apparatus, comprising:
- an ink stick feed bin having at least two feed channels to receive ink sticks;
- a top cover to open and close the ink stick feed bin;
- interlocking units interlockingly operating in accordance with the opening and closing of the top cover; and
- an elastic push unit elastically connected to the interlocking unit to elastically push the ink sticks in the feed channels, wherein the feed channels are arranged to have different predetermined positions with respect to at least one other feed channel in the longitudinal direction,
- wherein the feed channels each have different lengths, respectively, and wherein corresponding ends of the feed channels are attached to a corresponding melt plate in a straight line.

12. A solid ink loading apparatus, comprising:
- an ink stick feed bin having at least two feed channels to receive ink sticks;
- a top cover to open and close the ink stick feed bin;
- interlocking units interlockingly operating in accordance with the opening and closing of the top cover; and
- an elastic push unit elastically connected to the interlocking unit to elastically push the ink sticks in the feed channels, wherein the feed channels are arranged to have different predetermined positions with respect to at least one other feed channel in the longitudinal direction, wherein the feed channels are arranged shoulder to shoulder, wherein central ones of the feed channels are positioned at a first position and the outside feed channels are each positioned at a second position, the second position being staggered from the first position, and wherein corresponding ends of the feed channels are attached to a corresponding melt plate in a straight line.

13. An ink stick feed bin of an image forming apparatus comprising a plurality of feed channels to each receive an ink stick, the feed channels being aligned in a shoulder to shoulder formation, at least one of the channels being positioned at a first position in the feed bin and at least one other feed channel being positioned at a second position, the second position being staggered with respect to the first position.

14. The ink stick feed bin according to claim 13, wherein the plurality of feed channels comprises four feed channels, each feed channel being the same length, and each feed channel being staggered in a step formation with a uniform step depth with respect to the adjacent feed channels.

15. The ink stick feed bin according to claim 13, wherein the plurality of feed channels comprises four feed channels, each feed channel being the same length, and the center two feed channels being positioned at the first position and the outside feed channels being positioned at the second position.

16. An ink stick feed bin of an image forming apparatus comprising a plurality of feed channels to each receive an ink stick, the feed channels being aligned in a shoulder to shoulder formation, at least one of the channels being positioned such that an end thereof is positioned at a first position in the feed bin and at least one other feed channel being positioned such that an end thereof is positioned at a second position, the ends of each of the feed channels corresponding to each other, and the second position being staggered with respect to the first position.

17. The ink stick feed bin according to claim 16, further comprising:

an ink stick feed bin cover to open and close the ink stick feed bin;

a yoke interlockingly operating with the ink stick feed bin cover;

melt plates installed at corresponding ends of the feed channels to melt the ink sticks; and elastic push units elastically connected to the yoke to push the ink sticks in the feed channels towards the melt plates when the cover is closed.

18. The ink stick feed bin according to claim 17, wherein, when at least one ink stick is to be replaced, the ink stick feed bin cover is opened, thereby causing the elastic push units to retreat from the melt plates.

19. The ink stick feed bin according to claim 17, wherein the plurality of feed channels comprises four feed channels, each feed channel being a different length with the ends of the feed channels in which the melt plates are installed being located at the same positions, and each feed channel being staggered in a step formation with a uniform step depth with respect to the adjacent feed channels.

20. The ink stick feed bin according to claim 17, wherein the plurality of feed channels comprises four feed channels, each feed channel being a different length with the ends of the feed channels in which the melt plates are installed being located at the same positions, and the center two feed channels being positioned at the first position and the outside feed channels being positioned at the second position.

* * * * *